United States Patent [19]

Grenier

[11] 3,865,976

[45] Feb. 11, 1975

[54] ZONE GRID ASSEMBLY PARTICULARLY FOR HIGH RESOLUTION RADIOACTIVITY DISTRIBUTION DETECTION SYSTEMS

[75] Inventor: Raymond P. Grenier, Wilmington, Mass.

[73] Assignee: Baird-Atomic, Inc., Bedford, Mass.

[22] Filed: Mar. 22, 1973

[21] Appl. No.: 343,633

Related U.S. Application Data

[62] Division of Ser. No. 258,073, May 30, 1972, Pat. No. 3,787,685.

[52] U.S. Cl. ................................ 178/18, 340/365 L

[51] Int. Cl. ........................ G11c 11/06, G08c 21/00

[58] Field of Search .......................... 178/18, 19, 20; 340/166 FE, 166 S, 356 L, 146 SY; 335/205, 206; 46/238; 235/61.11 D; 200/46

[56] References Cited

UNITED STATES PATENTS

| | | | |
|---|---|---|---|
| 3,469,242 | 9/1969 | Eachus et al. | 340/365 L |
| 3,619,570 | 11/1971 | Grosbard | 235/61.11 D |
| 3,727,002 | 4/1973 | Pear, Jr. | 178/18 |

*Primary Examiner*—Thomas A. Robinson
*Attorney, Agent, or Firm*—Morse, Altman, Oates & Bello

[57] ABSTRACT

A zone grid assembly for flagging specified X,Y memory locations for accumulated data analysis and for presentation on a display in connection with a radioactivity distribution detection system. The zone grid assembly includes a printed circuit board formed with a plurality of holes and a pair of arcuate conductors disposed diametrically opposite one another about the periphery of each hole. A plurality of electrically conducting and magnetically responsive balls are slidably received within the zone grid assembly in such a manner that each ball is adapted for engagement and disengagement with one pair of conductors. A magnetic stylus held in spaced relationship with the zone grid assembly operates to actuate a ball in registration therewith into engagement with its associated pair of conductors. In consequence, the engaged pair of conductors are electrically connected and a signal denoting a particular X,Y position in the zone grid assembly is applied to the memory for processing, each X,Y grid position corresponding to an X,Y address location in the memory.

9 Claims, 7 Drawing Figures

ZONE GRID ASSEMBLY PARTICULARLY FOR HIGH RESOLUTION RADIOACTIVITY DISTRIBUTION DETECTION SYSTEMS

This is a division, of application Ser. No. 258,073, filed May 30, 1972, now U.S. Pat. No. 3,787,685, which issued Jan 22, 1974.

BACKGROUND OF THE INVENTION

1. Field of Invention

The present invention relates to high resolution radioactivity distribution systems and, more particularly, is directed towards a zone grid assembly for use with such systems.

2. Description of the Prior Art

Various types of detection systems for determining the distribution of radioactive material injected in diagnostic amounts into a human body have become known in the art. Data representing detected radioactive events are stored in memory address locations for presentation on a cathode-ray tube and a hard copy readout. Generally, these systems utilize complex zone flagging networks in conjunction with the cathode-ray tube display and hard copy readout for further evaluation of specific areas of interest. Zone flagging networks include the use of light pens and joy-stick configurations for presenting a high intensity spot on the cathode-ray tube display. Such detection systems have suffered from the disadvantages of undue complexity and limited correlation between the hard copy readout and the cathode-ray tube display.

SUMMARY OF THE INVENTION

It is an object of the present invention to provide a zone flagging network, particularly for high resolution radioactivity distribution detection systems, which does not suffer from the heretofore mentioned disadvantages. The zone flagging network is characterized by a zone grid assembly comprising a printed circuit board formed with a plurality of holes arranged in an X,Y array and provided with a pair of arcuate conductors disposed about the periphery of each hole. The arcuate conductors are interconnected by means of strip conductors in such a manner that a unique pair of strip conductors defines a particular X,Y point in the array. A retaining plate formed with a plurality of cylindrical guideways is mounted in juxtaposition with the printed circuit board. Each one of the guideways is in registration with one of the holes. An electrically conducting, magnetically responsive ball is slidably received within each guideway and is confined for movement therein, each one of the balls adapted for engagement and disengagement with one pair of conductors. The diameter of each ball is smaller than the diameter of each guideway and larger than the diameter of each hole. The zone grid assembly is adapted to receive a hard copy readout of detected radioactivity distribution corresponding to detected radioactivity distribution presented on a display. A magnetic stylus held in spaced relationship with the hard copy readout disposed in juxtaposition with the printed circuit board array operates to actuate a ball in registration therewith into engagement with its corresponding pair of arcuate conductors. In consequence, the engaged pair of conductors are electrically connected and a coded signal denoting a unique X,Y position in the array is presented at a pair of strip conductors. The coded signal is applied to a memory for storage in correlative X,Y address locations for further processing. The combination of a printed circuit board, retaining plate, magnetic responsive balls and magnetic stylus is such as to provide a simple flagging network characterized by one to one correlation between a hard copy readout and a display of detected radioactivity distribution.

The invention accordingly comprises the device possessing the construction, combination of elements, and arrangement of parts that are exemplified in the following detailed disclosure, the scope of which will be indicated in the appended claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE INVENTION

The present invention provides a radioactivity distribution detection system having a zone grid locating device for presenting and evaluating the relative concentration of a radioactive isotope at various depths within a section of a structure containing an unknown distribution of activity. Specific applications of the invention include the visualization and evaluation of body structures, organs and defects in subjects undergoing diagnosis following administration of radioactive material in a diagnostic amount. By complementing a radioactivity distribution detector having a visual display and a hard copy readout with a zone grid device, the invention provides a radioactivity distribution system characterized by one to one correlation among the display, readout and zone grid device for analysis and evaluation of specific areas of interest.

Figure 1:
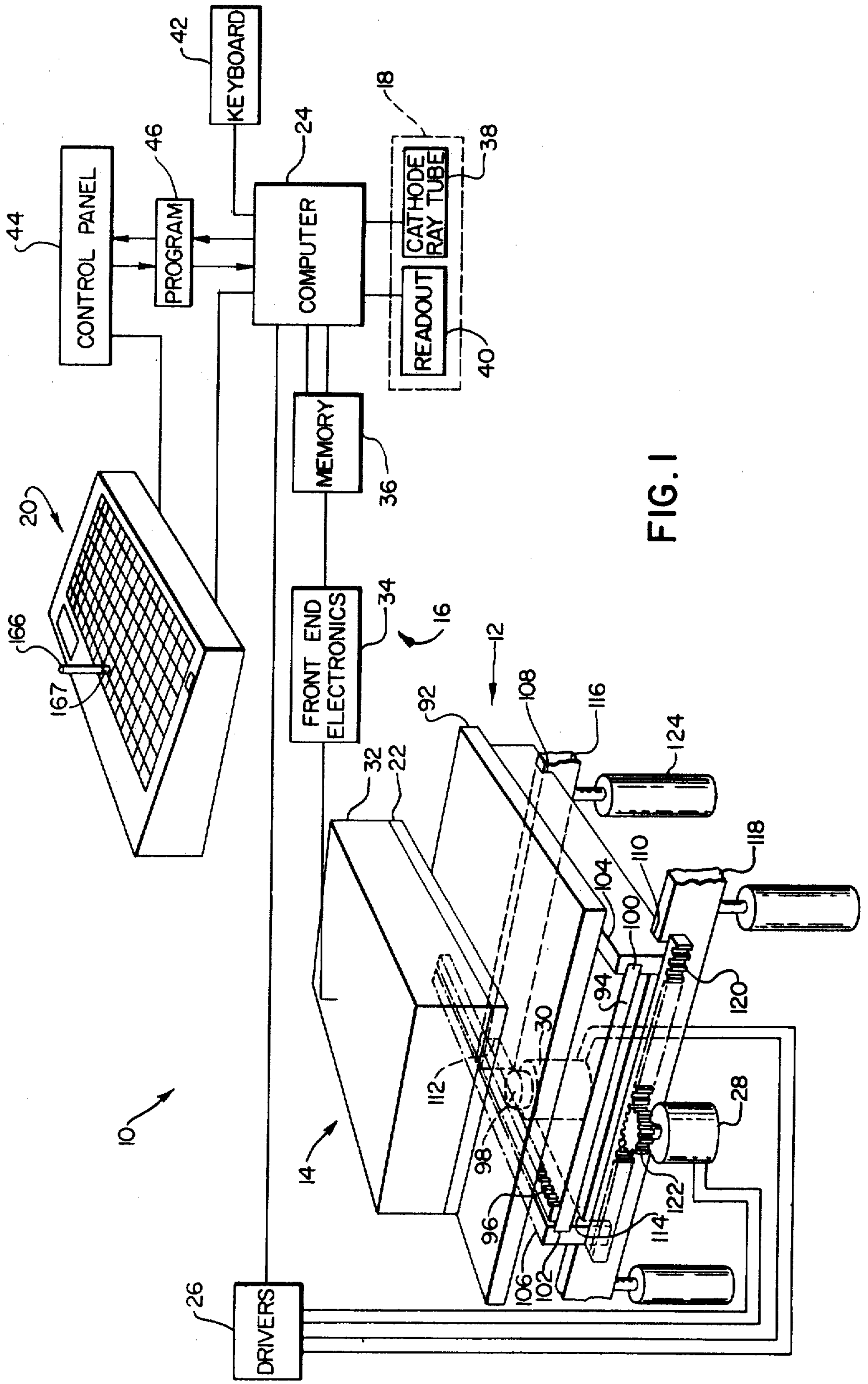
FIG. 1 is a schematic and block diagram of a system made in accordance with the present invention.

Referring now to FIG. 1, there is shown a radioactivity distribution detection system 10 comprising a programmable X,Y platform 12, a detector assembly 14, processing electronics 16, a display 18 and a zone grid assembly 20. A subject under diagnosis (not shown) is positioned on platform 12 which is in spaced relationship to detector assembly 14, a portion of the subject under analysis being in registration with a collimator 22. A computer 24 generates command signals which are applied to drivers 26 for selectively moving platform 12 in a programmed scanning step sequence with respect to detector assembly 14 by means of X and Y motors 30 and 28, respectively. Radioactive events are sensed in detector assembly 14 by means of radioactive sensitive elements 32 (FIG. 2), for example scintillators. The coordinate position of each acceptable scintillation event is digitized in front-end electronics 34 and fed to a buffer memory 36. Each event sensed at a particular X,Y location of the subject, i.e., the X,Y position of platform 12 with respect to detector 14, is addressed into memory 36 and accumulated to prior events having the same address. The number of events stored at a given address is the number of recorded disintegrations having originated within the monitored subject at a point, the X,Y location of which corresponds to the given address. Following the accumulation period, the accumulated data, in raw digital form, is applied to computer 24 for further processing. Computer 24 generates signals to display 18, for example a cathode-ray tube display 38 and a hard copy readout 40, for presentation. As hereinafter described, the hard copy presentation is utilized in conjunction with zone grid assembly 20 for flagging specified address locations in memory 36, an indication of the flagged address locations being presented on cathode-ray tube display 38. A manual data input 42, for example a keyboard, is provided for logging pertinent instruction data in computer 24. The operation of radioactivity distribution detection system 10 is directed from a control panel 44 which is interconnected with computer 24 via a programmer 46.

Figure 2:
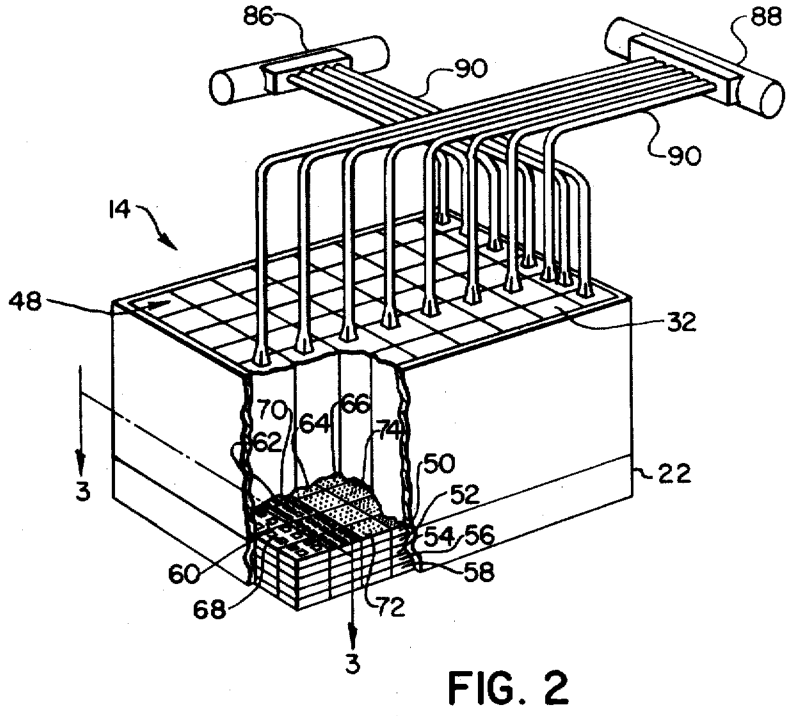
FIG. 2 is a perspective, partly broken away, of the detector assembly of FIG. 1.

Referring now to FIG. 2, it will be seen that detector 14 is an electro-optical system comprising an array 48 of individual radioactive sensitive elements 32 typically distributed in columns of 21 elements and in rows of 14 elements. Each element 32 is a scintillator composed of, for example a thallium activated sodium iodide crystal or a cesium crystal. It is to be understood that the occurrence of a scintillation event in any one scintillator 32 is sensed and its coordinate X,Y position is digitally encoded in front-end electronics 34 and fed into memory 36. As hereinafter described, the number of scintillation events for each X,Y step of the program scanning sequence is accumulated in a corresponding X,Y location in memory 36, for example a 294 word coincident current core memory. Upon completion of each scanning step, the events stored in memory 36 for that X,Y location of the subject with respect to detector 14 are coupled in parallel to computer 24 and memory 36 is cleared. That is, as platform 12 is moved to the next X,Y position, the events accumulated in memory 36 for the previous X,Y position of platform 12 are fed to computer 24 and memory 36 is cleared and readied for reception of new data.

Collimator 22 comprises a stack of registered plates 50, 52, 54, 56 and 58 formed with a series of holes sets 60, 62, 64 and 66. Hole set 60 includes four like collimator bores 68, hole set 62 includes nine like collimator bores 70, hole set 64 includes twenty-five like collimator bores 74. Each hole set occupies substantially the same area and is distinguished from another hole set by the number of collimator bores and the profile of the collimator bores, the smaller number of collimator bores in each set having the larger collimator bores profile. Each plate is composed of a radioactivity shielding material, for example a metal having at least the density of lead. In the preferred embodiment, each plate is composed of lead and each collimator bore is formed by a material removal process such as a photoetching technique using known chemical reactions. It is to be understood that, in alternative embodiments, the number of registered plates is other than five, for example one, three, four, seven and so on.

Figure 3:
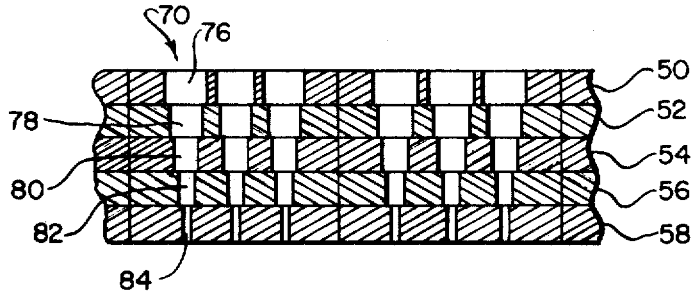
FIG. 3 is a section taken along the lines 3—3 of FIG. 2.

As best shown in FIG. 3 the interior faces of each collimator bore downwardly converge and define a downwardly and inwardly tapering collimator bore. As previously indicated, each plate is formed with a series of hole sets and each hole set includes a number of apertures having like profiles. Corresponding apertures of correlative hole sets of adjacent plates are in registration with one another and define a downwardly and inwardly converging collimator bore. That is, one of collimator bores 70 is defined by apertures 76, 78, 80, 82 and 84 of plates 50, 52, 54, 56 and 58, respectively. The profile of aperture 78 is slightly smaller than the profile of aperture 76, the profile of aperture 80 is slightly smaller than profile of aperture 78 and so on. From the foregoing, it will be readily appreciated that, although the faces of each aperture are substantially in a vertical plane, a stack of registered apertures having progressively smaller profiles defines a downwardly and inwardly converging collimator bore.

The collimator bores of each hole set are characterized by like focal lengths and each hole set is distinguished from another hole set by a different focal length. It is to be understood that, in alternative embodiments, collimator 22 is other than a multi-plane collimator, for example a single-plane collimator characterized by like collimator bores having like focal lengths. Array 48 is mounted in spaced registration with collimator 22 in such a manner that each scintillator 32 is disposed in registration with one collimator bore.

As best shown in FIG. 2, photomultiplying devices 86 and 88 are optically coupled to array 48 of scintillator crystals 32 by means of light transmitters 90, for example light pipes. Photomultiplier 86 includes a plurality of photodetectors (not shown), one photodetector for each column of scintillators 32 and photomultiplier 88 includes a plurality of photodetectors (not shown), one photodetector for each row of scintillators 32. Each photodetecting device is optically coupled to its associated detecting element by means of light pipes 90. In the illustrated embodiment, each light pipe 90 is composed of a material which transmits the wavelengths emitted from the scintillator, for example an acrylic resin material such as a methyl methacrylate, a clear epoxy, glass, etc. That is, each photomultiplier is connected to a plurality of photodetectors and each light pipe 90 optically couples one photodetector to one scintillator in a row or column. Each radioactivity event sensed by detecting element 32 produces an output signal which is multiplied by correlative photomultiplying devices 86 and 88. Each detecting element 32 within array 48 causes a response in only one unique pair of photodetectors. By reason of their optical coupling, photomultiplying devices 86 and 88 provide the X,Y coordinate position of the sensed radioactivity event. In other words, the arrangement of detecting elements 32, light pipes 90 and photodetectors is such as to provide a technique for obtaining digital information from array 48, each unique pair of photodetectors providing X and Y coordinate signal data of the sensed radioactivity event.

In alternative embodiments, the optical system is organized to obtain the digital coordinate information in a binary coded format. In such a case, each detecting element 32 has connected to it an adequate number of light conduits to provide a binary coded signal. The system is one of piping light from the crystal array for each scanning step of programmable platform 12 in order to obtain binary combinations representing the X,Y coordinate position of the event detected during that scanning step.

Referring again to FIG. 1 of the drawings, it will be seen that programmable X,Y platform 12 comprises a table 92 which is mounted to a slidable member 94. A rack 96 which engages a pinion 98 of motor 30 is mounted to member 94. Member 94 is slidably received in guideways 100, 102 which are provided in parallel guides 104, 106, respectively, rack 96 being in parallel spaced relationship to guides 104, 106. Guideway 100 extends along the longitudinal axis of guide 104 and guideway 102 extends along the longitudinal axis of guide 106. Guides 104 and 106 are formed also with a pair of transverse guideways 108, 110 and 112, 114 respectively. Guideway 108 is in registration with guideway 112 and guideway 110 is in registration with guideway 114. Fixed guides 116 and 118 are slidably received in guideways 108, 112 and 110, 114, respectively. Fixed guides 116 and 118 are in parallel spaced relationship with one another and in perpendicular spaced relationship with guides 104, 106. Mounted to guides 104, 106, in parallel spaced relationship with guides 116, 118, is a rack 120 which engages a pinion 122 of motor 28. It will be realized from the foregoing description that table 92, member 94 and rack 96 are slidable in a first direction within guideways 100, 102; and guides 104, 106 and rack 120 are slidable in a second direction within guideways 108, 110 and 112, 114; the first and second directions being mutually perpendicular to one another. For convenience, by way of example, the first and second directions will be referred to as the X and Y directions, respectively. It will be readily appreciated that motor 30 operates to move table 92 in the X direction and motor 28 operates to move table 92 in the Y direction. Motors 28 and 30, for example stepping motors, are controlled by signals generated by drivers 26 in response to command signals initiated by computer 24. It is to be understood that platform 12 is movable also in the Z axis by means of lifting devices 124, for example jack screws.

In the illustrated embodiment, computer 24 is programmed to move platform 12 in a scanning sequence of 16, 8 or 4 incremental steps, each step being an integral multiple of the distance between adjacent scintillators 32. It is to be understood that, in alternative embodiments, the number of incremental scanning steps is other than 16, 8 or 4, for example 32, 2 or 1. Since detector 14 comprises 294 elements arranged in columns of 21 and in rows of 14, each incremental step measures 294 independent spatial segments which corresponds to the 294 spatial segments of multi-plane collimator 22. Each collimator bore is used to limit the field of view of each scintillator 32 to a unique spatial segment in the object being measured. In this manner, an image of the organ under diagnosis is obtained which is made up on 294 picture elements corresponding to the 294 unique spatial segments isolated by the multi-plane collimator. The shape and volume of each separate spatial segment in the object is defined solely by the geometry of each collimator bore. The multi-plane collimator divides the organ under diagnosis into 294 equal spatial segments which are then presented as 294 picture elements. The shape and volume of the spatial segment isolated by the collimator bore determines the spatial resolution of the imaging system, the spatial resolution obtainable being dependent upon the number spatial segments. That is, the information content of the final image defines a one-to-one correspondence to the number of independent spatial segments that are isolated by the collimator bores. Different collimator configurations result in spatial segments which differ in shape and volume. In the illustrated collimator configuration, measurments are obtained at different depths within the subject under diagnosis. It is to be understood that, in alternative embodiments, collimator 22 comprises a plurality of like collimator bores and measurements are obtained at a single depth with the subject under diagnosis.

The shape and volume of the spatial segment isolated by each collimator bore is altered due to septal penetration, Compton scattering, and finite intrinsic spatial resolution of the detector. The final image with maximum information content is achieved when the volumen of interest is viewed with the highest number of independent spatial segments, and when each independent spatial segment is recorded with a statistically significant number of detected events. The number of independent spatial segments observable is increased to the theoretical limit of collimator resolution by moving the subject to a number of N different positions. Since each position measures 294 independent spatial segments, which generate the corresponding 294 picture elements, the final image consists of N times 294 picture elements. The information content of each picture element is determined uniquely by the collimator with no deterioration of information due to finite intrinsic spatial resolution of the detector. This information integrity is maintained because the array of individual crystals yields a unique X,Y position for every event detected. Septal penetration is minimized by using thicker collimators which maintain sufficiently thick septa. The number of independent spatial segments cannot be increased by simply increasing the number of holes in the collimator, except at low energy, because septal penetration destroys the information content of each picture element, i.e., the spatial segments blow up in size.

Preferably, an isotope such as Technetium 99m (Tc99m) is used because it is a pure gamma emitter whch minimizes dose to the patient. Tc99m is administered in allowed doses that yield observed events of about 20,000 per second. Application of other isotopes, such as IN113m and Bal 137m allow at least an equal or greater amount of specific activity for the same dose with the two fold advantage of higher penetration through the cranium and better staining qualities.

As previously indicated, multi-plane collimator 22 comprises four collimators repeated over the array of crystals. In the preferred embodiment, these four focussed collimators are provided with 4, 9, 16, and 26 holes having focal lengths of 1.5, 2.0, 2.5 and 3.0 inches, respectively. The thickness of the collimator is approximately 0.40 inch with a spatial resolution of approximately 0.44 inch. The data obtained during the accumulation periods are stored in the proper address locations in memory 36 in order to generate four separate images corresponding to the four focal depths. All four views are simultaneously presented in one single image for easy evaluation.

Data accumulated for the first incremental scanning step is addressed into memory 36 in the manner hereinbefore described. At the end of the first accumulation period, the data in memory 36 is fed to computer 24 for further processing and memory 36 is cleared. Platform 12 is then moved to the second incremental scanning step, a new frame of data is accumulated and is stored in memory 36. When the last incremental scanning step data stored in memory 36 has been fed to computer 24, the system is ready to present a combined image display.

The stored data is selectively presented on cathode-ray tube display 38 and hard copy readout 40. In the preferred embodiment, the numerical data generated by computer 24 and fed to display 18 is converted into a binary coded symbol whose half-tone value is proportional to the number of recorded events. That is, the combined image presented on the cathode-ray tube display 38 is a composite half-tone display which represents the number of recorded events for each X,Y address position, the greatest number of recorded events being represented by the highest intensity or brighter image. In accordance with the teachings of the present invention the hard copy presentation obtained from readout 40 is utilized in conjunction with zone grid assembly 20 for flagging specified address locations in memory 36.

Figure 4:
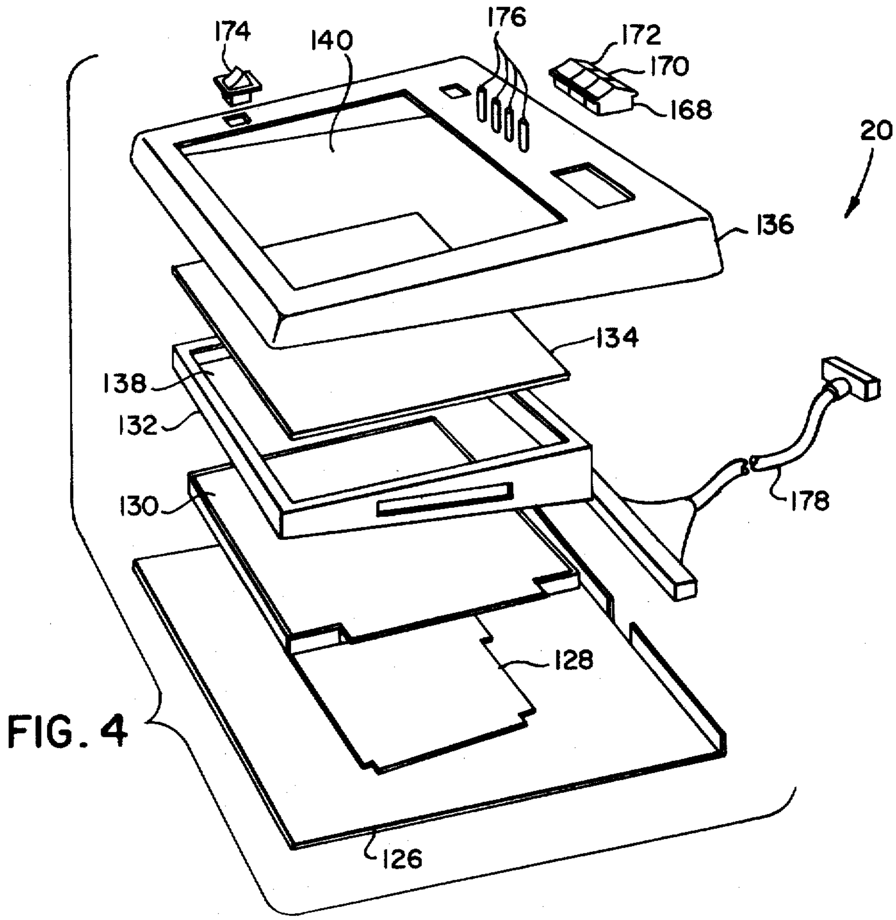
FIG. 4 is an exploded view of the zone flagging network of FIG. 1.

Referring now to FIG. 4, it will be seen that zone grid assembly 20 comprises a base 126, a position coder panel 128, a sensing assembly 130, a frame 132, a zone grid member 134 and a housing 136. Position coder panel 128 is interposed between base 126 and sensing assembly 130. Frame 132, which is in juxtaposition with sensing assembly 130, is formed with a recess 138 which is adapted to receive zone grid member 134. Housing 136 defines an apertured cover plate which is mounted to base 126 and operates to fixedly secure position coder panel 128, sensing assembly 130 and frame 132. As hereinafter described, sensing assembly 130 and zone grid member 134 are mounted in registration with a window 140 of cover plate 136.

Figure 5:
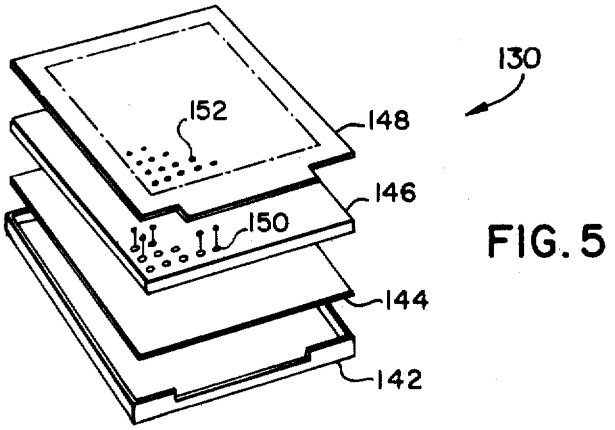
FIG. 5 is an exploded view of the zone grid assembly of FIG. 4.

Referring now to FIG. 5, it will be seen that sensing assembly 130 includes a support 142 which is adapted to receive a pad 144, a retaining board 146 and a sensing member 148. Retaining board 146, which is composed of an electrical insulating material, for example a resin such as an epoxy resin, is formed with a plurality of guideways 150. In the illustrated embodiment, retaining board 146 is formed with 294 guideways 150 which corresponds to the number of address locations in memory 36. Pad 144, which is composed of a fibrous material such as felt, is interposed between retaining board 146 and support 142. Sensing member 148 is formed with a plurality of holes 152, one of each holes 152 being in registration with one of each guideways 150.

Figure 6:
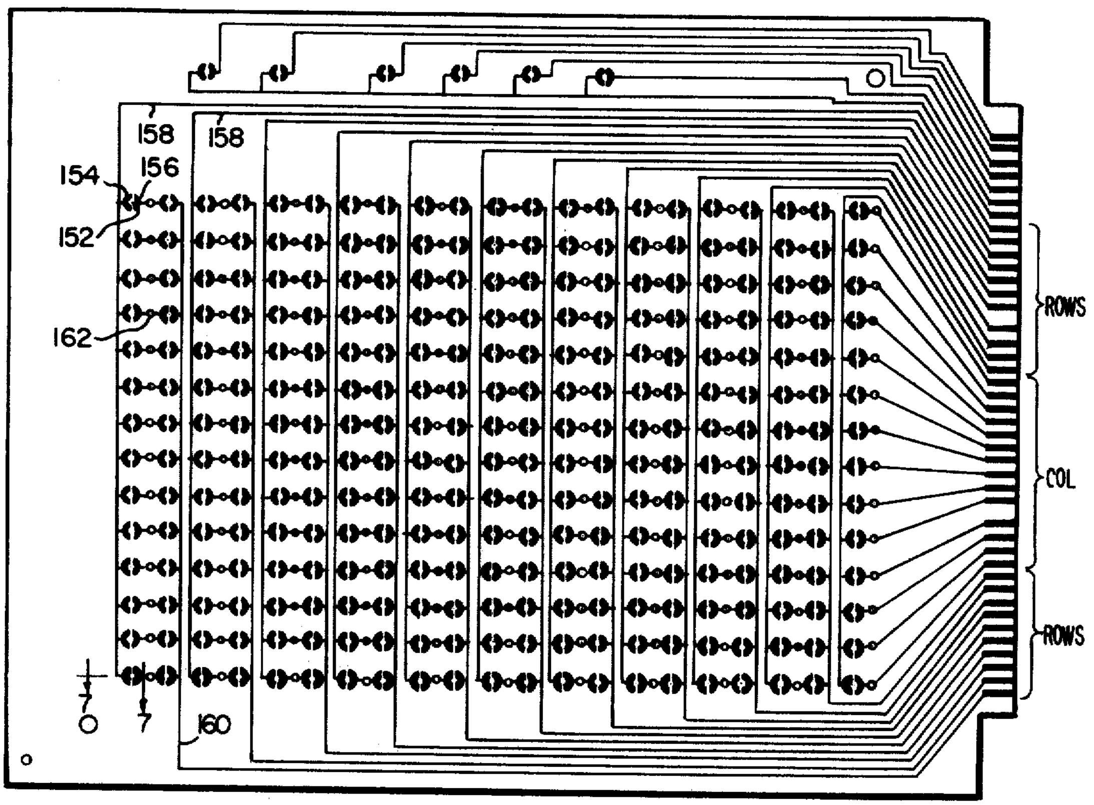
FIG. 6 is a plan view of a printed circuit board of the zone grid assembly of FIG. 5.

Referring now to FIG. 6, it will be seen that a pair of electrical conductors 154, 156 are disposed about each hole 152 at the underside of sensing member 148. In the illustration, holes 152 are arranged in a grid pattern in columns and rows, each column containing 21 holes 152 and each row containing 14 holes 152. In other words, holes 152 are distributed in a grid pattern corresponding to array 48 of elements 32. By way of example, conductors 154, which are disposed in odd numbered column, i.e., column numbers 1, 3, 5, etc. as viewed from left to right in FIG. 6, and are interconnected by means of conductors 158. Conductors 156 which are disposed in even numbered columns are interconnected by means of conductors 160. Conductors 156 in odd numbered columns and conductors 154 in even numbered columns are interconnected by means of conductors 162. From the foregoing, it will be realized that conductors 158 and 160 define rows of holes 152 and conductors 162 define columns of holes 152. Accordingly, it will be readily appreciated that each hole 152 is associated with a unique pair of conductors 154, 156 and is identified by either a unique pair of conductors 156, 160 or a unique pair of conductors 158, 160.

Each pair of conductors 154, 156 describe an arcuate conductor disposed about the periphery of each hole 152 formed in sensing member 48. In the preferred embodiment, sensing member 148 is a printed circuit board composed of an electrical insulating material, for example a resin such as an epoxy resin and conductors 154, 156, 158, 160 and 162 are formed by a material removal process such as a photoetching technique using known chemical reactions. Each conductor 154, 156, 158, 160 and 162 is composed of an electrical conducting material, for example copper.

Figure 7:
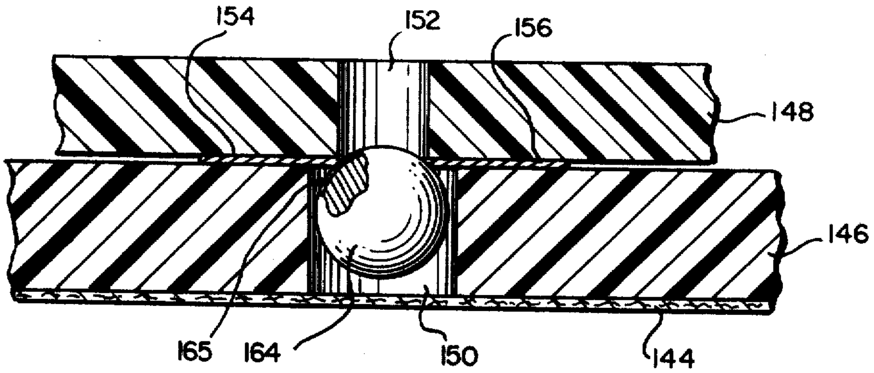
FIG. 7 is a section taken along the lines 7—7 of FIG. 6.

As best shown in FIG. 7, by way of example, each guideway 150 is a cylindrical cavity having a diameter larger than the diameter of each hole 152, each hole 150 being coaxial with its correlative hole 152. A contacting member 164, composed of a magnetic responsive material, for example steel, is received within each cavity 150. In the illustrated embodiment, contacting member 164 is in the form of a steel ball having a gold plated outer shell 165. The diameter of ball 164 is smaller than the diameter of cavity 150 and larger than the diameter of hole 152. Contactors 154 and 156 are disposed in juxtaposition with the top surface of retaining board 146. Accordingly, if a stylus 166 (FIG. 1) having a magnetic tip portion 167 is placed adjacent one hole 152, ball 164 is actuated into engagement with contactors 154, 156 associated therewith. In consequence, the engaged pair of contactor 154, 156 are connected electrically and an appropriate signal is presented either on a unique pair of conductors 158, 162 or on a unique pair of conductors 160, 162. In the illustrated embodiment, conductors 154, 156, 158, and 160 are disposed on a common face of printed circuit board 148 and conductors 162 are disposed on an opposite face thereof.

In the illustrated embodiment of FIG. 4, it will be seen that zone grid assembly 20 is provided with switching devices 168, 170, 172, 174, 176 which are suitably mounted to housing 136 and electrically connected to position coder panel 128. By way of example, switching devices 168, 170, 172, 174 and 176 serve the functions of ON/OFF, DISPLAY, ERASE/CLEAR, ENTER FLAGGING and ZONE FLAGGING, respectively. Position identifying signals as presented by conductors 158, 160 and 162 and function signals as generated by switching devices 168, 170, 172, 174 and 176 are fed to position coder panel 128 which is further connected to computer 24 via connector cable assembly 178.

As hereinbefore described, a combined image of radioactivity events is presented on cathode-ray tube display 38 and hard copy readout 40. In order to evaluate specific areas of interest, the hard copy from readout 40 is positioned on housing 136 and switch 168 is placed in the ON position. Stylus 166 is moved about the hard copy at the specific areas of the combined image of which further evaluation is desired. If DISPLAY switch 170 is energized, a high intensity luminous spot is presented on cathode-ray tube display 38 as stylus 166 is moved about zone grid member 134. If an error occurs, ERASE/CLEAR switch 172 is energized to the ERASE position and the high intensity luminous spots are erased from cathode-ray tube display 38. Specific areas of interest are flagged by energizing ZONE FLAGGING switches 176. When ENTER FLAGGING switch 174 is engaged the X,Y positions of each segment of the combined image i.e., X,Y positions of selected conductors 154, 156 are entered into memory 36. When ERASE/CLEAR switch 172 is energized to the CLEAR position, memory 36 is cleared of the flagged X,Y positions entered therein.

It will be readily appreciated that the zone grid assembly and radioactivity distribution detection system herein described is such as to provide unlimited evaluation of radioactive events on a one to one correlation basis between a hard copy readout and cathode-ray tube display. Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A position identifying device comprising:

a. a base formed with a plurality of bores arranged in a pattern;

b. a spherical contacting member retained in each said bore, the diameter of each said contacting member being less than the diameter of each said bore, the depth of each said bore greater than the diameter of each said contacting member, each said contacting member slidable between first and second positions;

c. a printed circuit board formed with a plurality of holes, arcuate conductor pairs and elongated conductors, said holes arranged in a pattern corresponding to said pattern of bores, said printed circuit board mounted on said base in face to face relationship, said bores and said holes in axial relationship, the diameter of each said hole being less than the diameter of each said contacting member, one of each said arcuate conductor pairs disposed about the periphery of one of each said holes, each said arcuate conductor pair defining first and second conductors, each said contacting member operative to engage and disengage said conductor pair, said contacting members in engagement with said conductor pair when in said first position and disengaged from said conductor pair when in said second position, said first conductor electrically isolated from said second conductor when said conducting member associated therewith is in said second position, an electrical path established between said first and second conductors through said associated contacting member in said first position, one end of certain ones of said elongated conductors connected to selected ones of said first conductors, one end of certain others of said elongated conductors connected to selected other ones of said second conductors, the other ends of said elongated conductors defining a plurality of terminal means, a pair of said terminal means uniquely associated with each said hole; and d. means for selectively actuating said contacting members into said first position, a pair of said terminal means uniquely identifying the position of said actuated contacting member.

2. The position identifying device as claimed in claim 1 wherein one of said contacting members and actuating means includes a member composed of a magnetic responsive material and the other of said contacting members and actuating means includes a member composed of a magnetic material.

3. The position identifying device as claimed in claim 1 wherein at least a portion of each said contacting member is composed of a magnetic responsive material and at least a portion of each said actuating means is composed of a magnetic material.

4. A position identifying device comprising:

a. a base having upper and lower faces;

b. a retaining member mounted to said base, said retaining member having upper and lower faces, said retaining member lower face in juxtaposition with said base upper face, said retaining member formed with a plurality of bores arranged in a pattern;

c. a spherical contacting member in each said bore, the diameter of each said contacting member being less than the diameter of each said bore, the depth of each said bore greater than the diameter of each said contacting member, each said contacting member slidable between first and second positions;

d. printed circuit board means having upper and lower faces, said printed circuit board formed with a plurality of holes disposed in a pattern corresponding to said pattern of bores, said printed circuit board means including a plurality of arcuate conductor pairs and elongated conductors disposed on said lower face thereof, said printed circuit board means mounted to said retaining member, said printed circuit board means lower face in juxtaposition with said retaining member upper face, said bores and said holes in axial relationship, the diameter of each said hole less than the diameter of each said contacting member, one of each arcuate conductor pairs disposed about the periphery of one of each said holes, each said arcuate conductor pair defining first and second conductors, said first conductor electrically isolated from said second conductor when said conducting member associated therewith is in said first position, an electrical path established between said first conductor and said second conductor through said contacting member when said contacting member is in said second position, one end of certain ones of said elongated conductors connected to selected ones of said first conductors, one end of certain other ones of said elongated conductors connected to selected ones of said second conductors, the other ends of said elongated conductors defining a plurality of terminal means, a pair of said terminal means uniquely associated with each said hole;

e. zone grid means mounted on said upper face of said circuit board means; and f. stylus means for actuating said contacting members into said second position, a pair of said terminal means uniquely identifying the position of said actuated contacting member.

5. The position identifying device as claimed in claim 4 wherein at least a portion of one of said contacting members and said stylus means is composed of a magnetic responsive material and at least a portion of the other of said contacting members and said stylus is composed of a magnetic material.

6. The position identifying device as claimed in claim 4 wherein at least a portion of said contacting member is composed of a magnetic responsive material and at least a portion of each said stylus means is composed of a magnetic material.

7. The position identifying device as claimed in claim 6 wherein each said contacting member includes a central portion in the form of a ball having a plated outer shell, said central portion composed of a magnetic responsive material and said plated outer shell is composed of a conducting material.

8. The position identifying device as claimed in claim 7 wherein said central portion is composed of steel.

9. The position identifying device as claimed in claim 8 wherein said plated outer sheel is composed of gold.

* * * * *